Patented June 9, 1936

2,043,869

UNITED STATES PATENT OFFICE 2,043,869

MONOAZO DYESTUFFS

Max Schmid, Riehen, near Basel, Switzerland, assignor to the firm Society of Chemical Industry in Basle, Basel, Switzerland No Drawing. Application July 17, 1935, Serial No. 31,921. In Switzerland July 21, 1934

10 Claims. (Cl. 260—86)

This invention consists in the manufacture of new valuable unsymmetrical diacylated derivatives of aromatic diamino-compounds by first acylating an amino-group in such diamino-compound by means of an acylating agent which contains no $COCH_2$-group capable of coupling and then converting the monoacyl-compound thus produced, by treating it with an ester of a $\beta$-ketone-carboxylic acid, into an arylide of the general formula

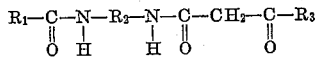

in which $R_1$ represents an alkyl or aryl radical, $R_2$ the radical of an aromatic diamine-compound, and $R_3$ an alkyl or aryl radical. These products may also be made by converting the aromatic diamino-compound by condensation with 1 mol. of a $\beta$-ketone-carboxylic acid ester into a mono-acylated diamine of the formula

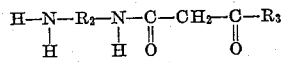

wherein $R_2$ and $R_3$ have the significance already given, and then converting this monoacylated diamine into the unsymmetrical diacylated derivative required by the invention by condensation by means of an acylating agent which contains no $COCH_2$-group capable of coupling.

As aromatic diamino-compounds there may be used, quite generally, aromatic para- and meta-diamines, as well as their derivatives; such products are, for example para- and meta-phenylene diamine or toluylenediamine and their nuclear substitution products, for instance the halogen or alkoxy-derivatives; benzidine; tolidine; dianisidine; dichlorobenzidine; products like 4,4'- or 3,3'-diamino-diphenylmethane or 4,4'- or 3,3'-diamino-benzophenone; 4,4'-diamino-stilbene; 4,4'- or 3,3'-diaminodiphenylurea; 3,3'-, 4,4'-, 4,3'- or 4',3-diaminobenzanilide; 4,4'-diamino-diphenylether or -sulfide; 4,4'- or 4,3'-diamino-phenoxyacetylaminobenzene, 4,4'-diaminoazobenzene; 4,4'-diamino-2'-methyl-5-methoxyazobenzene; 4,4'- or 3,3'-diamino-azoxybenzene or the like.

As $\beta$-ketonecarboxylic acid esters there may be used aceto-acetic esters and their analogues, for example benzoyl-acetic esters, or terephthaloyl-acetic esters; also malonic esters.

As acylating agents containing no $COCH_2$-group capable of coupling there may be named acetylating agents, propionylating agents, substituted acylating agents such as phenoxyacetylating agents, benzoylating agents, substituted aroylating agents, or the like.

The new, unsymmetrical diacylated derivatives dissolve, in consequence of the presence of the $—COCH_2CO—$groups in alkalies and are capable of coupling with diazo-compounds to form azo-dyestuffs. They have a very good affinity for vegetable fibre as well as for regenerated cellulose, so that they may be used with success for producing fast tints on the fibre by the usual ice-color methods. Such methods are, for example, padding the fibre in an alkaline solution of the new arylide and developing with a diazo-compound the fibre thus prepared. The new compounds may also be made into preparations of printing colors which contain an alkali salt of the new asymmetrically acylated derivatives of aromatic diamino compounds and a diazo-compound stabilized in the form of a nitrosamine or of a diazo-amino-compound. These preparations may be printed on the fibre and then developed into dyestuffs by suitable treatment, for example by passage through acid. By another method a mixture of the free diazotizing component or the corresponding N-nitramine and of an alkali salt of the new coupling component may be printed on the fibre and then converted into the dye-stuff by development with nitrous acid and, if desired, by subsequent treatment with alkali.

In many cases it is advisable to use the diazo-compounds in the form of stable diazo-compounds. There may be applied here the double salts which are obtained by causing the diazo-compounds to react with heavy metal salts, such as zinc chloride, or with aromatic sulfonic acids, such as chlorobenzene sulfonic acid, naphthalene-monosulfonic or -disulfonic acid, such as 1,5-naphthalene-disulfonic acid, or sulfonic acids of other products, such as, for example, the mono- and disulfonic acids of the diphenyl oxide, diphenylene oxide or diphenylene dioxide.

Among the dyestuffs of the present application, which correspond to the general formula

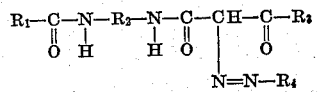

in which $R_1$ represents an alkyl or aryl radical $R_2$ the radical of an aromatic diamine-compound, $R_3$ an alkyl or aryl radical, and $R_4$ the radical of such a diazo-compound which contains no group promoting solubility, those are particularly valuable which derive from the arylides of the general formula

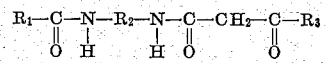

already explained, in which the radical $R_2$ corresponds with the radical of a diamino-compound of the diphenyl series, such as benzidine, tolidine or dianisidine, i. e. compounds which belong to the group of the 4,4'-diaminodiphenyl compounds. Among the dyestuffs of this group those are again particularly valuable in which the radical $R_1$ represents the radical of an aliphatic carboxylic acid containing not more than 3 carbon atoms, such as for example the radical of the propionic acid, of the acetic acid, of the monochloroacetic acid or of the methoxy acetic acid. In this group those are again valuable dyestuffs in which $R_3$ stands for $CH_3$, i. e. dyestuffs deriving from condensation products from ethyl acetoacetate. For carrying out the process there may be used quite generally diazo-compounds of the benzene, naphthalene and anthraquinone series which contain no $SO_3H$ or $COOH$ groups, and which have already been recommended in the usual dyeing with ice-colors. There may of course also be used other diazo-compounds such as, for example, those which derive from aminoazo-compounds or from heterocyclic compounds, such as aminocarbazole or aminodiphenylene oxides. Among these diazo-compounds those of the benzene series, particularly mononuclear diazo-compounds of the benzene series, are valuable. Due to their beautiful shades and other valuable fastness properties, the dyestuffs from esters of the anthranilic acid are particularly valuable.

The new, unsymmetrical diacylated products may also be used for making other dyestuffs. Thus they yield in substance, when combined with the same nonsulfonated compounds with which they are used for making fast tints on the fibre, pigments which may be applied as such or for coloring lacquers, varnishes or the like; with sulfonated diazo-compounds they couple to form wool- and cotton-dyestuffs soluble in water.

The following examples illustrate the invention without, however, limiting its scope, the parts being by weight:—

Example 1

22.6 parts of monoacetyl benzidine, produced in known manner, and 200 parts of xylene are heated together to boiling in a closed apparatus having a reflux condenser, while stirring. Into the feebly boiling mass there are dropped in, in the course of about half-an-hour, 16 parts of ethylacetoacetate. Boiling is continued for about half-an-hour under such conditions that about 80–100 parts of xylene distil. The whole is then allowed to cool and the solid matter filtered and heated in steam to expel adhering xylene. It is then dissolved in a cold aqueous alcoholic sodium hydroxide solution. The solution is filtered and from the filtrate there is obtained by precipitation and drying a white powder of melting point 238–240° C. Instead of monoacetylbenzidine there may be used any other monoacyl-diamino-diphenyl-compound, such as monoformylbenzidine, monobenzoylbenzidine or the like.

Example 2

127 parts of monoacetyl-ortho-ortho'-tolidine, made by monoacetylating ortho-ortho'-tolidine, 600 parts of chlorobenzene and 2 parts of diethylaniline, are heated together to boiling in a closed apparatus having a reflux condenser, while stirring. After distilling of about 100 parts of chlorobenzene, 100 parts of ethyl-aceto-acetate are dropped into the mass in the course of about half-an-hour and a few drops of diethylaniline are mixed into the mass, which is then boiled feebly for 2–3 hours and then cooled. The mixture is then distilled with steam to remove the chlorobenzene.

The residue is dissolved in dilute caustic soda solution and the solution is filtered. Addition of acid to the filtrate precipitates a white powder of melting point 222–223° C. which, in caustic soda solution, couples with one equivalent of a diazonium compound.

By condensing first one equivalent of the diamine with one equivalent of ethylacetoacetate and then acylating the free amino-group, like products are obtained.

Example 3

25.3 parts of ortho-ortho'-dichlorobenzidine and 200 parts of xylene are heated together, while stirring, to feeble boiling in a closed apparatus having a reflux condenser. Without lowering of the temperature there are added by drops, in the course of half-an-hour, 15 parts of ethyl acetoacetate mixed with 50 parts of xylene, and the mixture is kept for about half-an-hour feebly boiling; it is then cooled to about 60° C. and at this temperature mixed with 12.2 parts of acetic anhydride and finally stirred for about half-an-hour while at 60° C. Further procedure is as described in Example 2, whereby there is obtained a white powder of melting point 183–185° C.

A like product is obtained by condensing monoacetyl-ortho-ortho'-dichlorobenzidine with ethylacetoacetate, as described in Example 2.

Example 4

16.1 parts of 2:5-dichloraniline are diazotized in the usual manner and introduced into a solution of 33.8 parts of para-acetyl-para'-acetoacetyl-ortho-ortho'-tolidide, 100 parts of caustic soda solution of 30 per cent. strength and 15 parts of calcined sodium carbonate in 2000 parts of water. The dyestuff is immediately precipitated. It is filtered and dried. The formula of the new dyestuff is

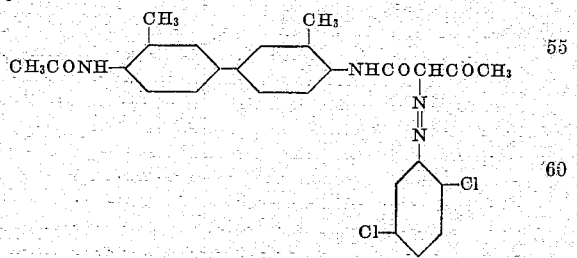

Example 5

Cotton yarn is impregnated with a grounding liquor made by dissolving 3 parts of para-acetyl-para'-acetoacetyl-ortho-ortho'-tolidide in 300 parts of hot water with the addition of 10 parts of sodium hydroxide solution of 30 per cent. strength and 10 parts of Turkey red oil, there being also present sodium chloride or sodium sulfate, and making up the whole to 1 litre. The yarn is wrung out and developed in a diazo-solution, buffered with sodium acetate and acidified with acetic acid, corresponding with 2 parts of 1-amino-2-methyl-4-chlorobenzene. There is produced a pure greenish-yellow of very good fastness to washing, chlorine and keir-boiling. The formula of the new dyestuff is

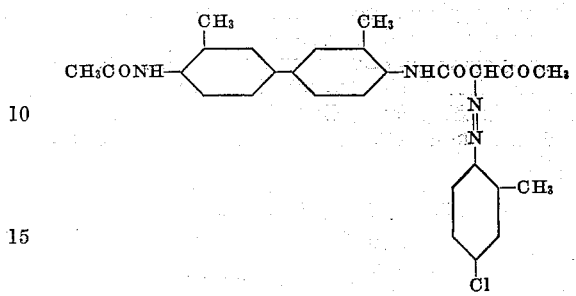

The grounding may occur at a higher temperature, for example at 80° C.; such arylides may be applied also in piece dyeing or in printing.

The following table sets forth the dyeings obtainable in accordance with the foregoing examples when other components are used:—

| Diazo-compound from | Coupled with | Shade |
| --- | --- | --- |
| (1) Ortho-chloraniline | Para-acetyl-para'-acetoacetyl-ortho-ortho'-tolidide. | Green-yellow. |
| (2) 4-chloro-2-nitraniline | ___do___ | Orange. |
| (3) 4-chloro-2-aminodiphenylether | ___do___ | Yellow. |
| (4) 4, 4'-dichloro-2-aminodiphenylether | ___do___ | Orangish-yellow. |
| (5) 4, 2'-dichloro-2-aminodiphenylether | ___do___ | Yellow. |
| (6) 1-amino-2-methoxy-4-nitrobenzene | ___do___ | Orange. |
| (7) 1-amino-2-nitro-4-methylbenzene | ___do___ | Yellow-orange. |
| (8) Ethylester of 2-amino-4'-chloro-1, 1'-diphenyl-sulfone-4-carboxylic acid. | ___do___ | Yellow. |
| (9) Ortho-chloraniline | Para-acetyl-para'-acetoacetyl-ortho-ortho'-dichlorobenzidide. | Green-yellow. |
| (10) 4-chloro-2-nitraniline | ___do___ | Orange. |
| (11) 4-chloro-2-aminodiphenylether | ___do___ | Greenish-yellow. |
| (12) 4, 4'-dichloro-2-aminodiphenylether | ___do___ | Yellow. |
| (13) 1-amino-2-methyl-4-chlorobenzene | ___do___ | Green-yellow. |
| (14) 4, 2'-dichloro-2-aminodiphenylether | ___do___ | Yellow. |
| (15) 1-amino-2-methoxy-4-nitrobenzene | ___do___ | Do. |
| (16) 1-amino-2-nitro-4-methylbenzene | ___do___ | Yellow-orange. |
| (17) Ethylester of 2-amino-4'-chloro-1, 1'-diphenyl-sulfone-4-carboxylic acid. | ___do___ | Do. |
| (18) 2, 5-dichloraniline | ___do___ | Yellow. |
| (19) 2, 5-dichloraniline | Para-acetyl-para'-acetoacetylbenzidide | Do. |
| (20) 1-amino-2-methoxy-5-chlorobenzene | Para-acetyl-para'-acetoacetyl-ortho-ortho'-tolidide. | Do. |
| (21) Anthranilic acid-methylester | ___do___ | Do. |
| (22) Anthranilic acid-ethylester | ___do___ | Do. |
| (23) α-Aminoanthraquinone | ___do___ | Do. |
| (24) β-Naphthylamine | ___do___ | Do. |
| (25) 1-chloro-2-naphthylamine | ___do___ | Do. |
| (26) α-Naphthylamine | ___do___ | Reddish-yellow. |
| (27) Aminoazobenzene | ___do___ | Orange yellow. |

The dyestuffs 1, 4, 6, 20 and 22 of the foregoing table correspond with the following formulae:—

What I claim is:—

1. The monoazo dyestuffs of the general formula

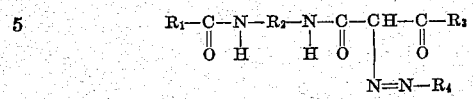

in which $R_1$ represents a radical of the group consisting of alkyl radicals and aryl radicals of the benzene series, $R_2$ a radical of an aromatic 4,4'-diamino-compound of the diphenyl series, $R_3$ a radical of the group consisting of alkyl radicals and aryl radicals of the benzene series, and $R_4$ the radical of such a diazo-compound which contains no group promoting solubility, which products are yellow powders dissolving in pyridine to green-yellow to orange and in sulfuric acid to green-yellow to scarlet solutions, and dyeing the vegetable fiber fast yellow tints.

2. The monoazo dyestuffs of the general formula

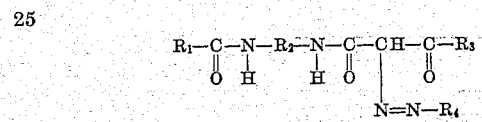

in which $R_1$ represents a radical of the group consisting of alkyl radicals and aryl radicals of the benzene series, $R_2$ a radical of an aromatic 4,4'-diamino-compound of the diphenyl series, $R_3$ a radical of the group consisting of alkyl radicals and aryl radicals of the benzene series, and $R_4$ the radical of such a diazo-compound of the benzene series which contains no group promoting solubility, which products are yellow powders dissolving in pyridine to green-yellow to orange and in sulfuric acid to green-yellow to scarlet solutions, and dyeing the vegetable fiber fast yellow tints.

3. The monoazo dyestuffs of the general formula

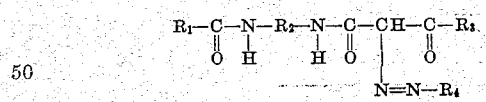

in which $R_1$ represents an alkyl radical, $R_2$ a radical of an aromatic 4,4'-diamino-compound of the diphenyl series, $R_3$ a radical of the group consisting of alkyl radicals and aryl radicals of the benzene series, and $R_4$ the radical of such a diazo-compound of the benzene series which contains no group promoting solubility, which products are yellow powders dissolving in pyridine to green-yellow to orange and in sulfuric acid to green-yellow to scarlet solutions, and dyeing the vegetable fiber fast yellow tints.

4. The monoazo dyestuffs of the general formula

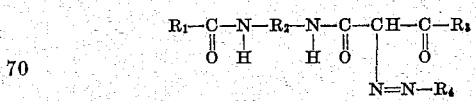

in which $R_1$ represents an alkyl radical containing not more than 3 carbon atoms, $R_2$ a radical of an aromatic 4,4'-diamino-compound of the diphenyl series, $R_3$ a radical of the group consisting of alkyl radicals and aryl radicals of the benzene series, and $R_4$ the radical of such a diazo-compound of the benzene series which contains no group promoting solubility, which products are yellow powders dissolving in pyridine to green-yellow to orange and in sulfuric acid to green-yellow to scarlet solutions, and dyeing the vegetable fiber fast yellow tints.

5. The monoazo dyestuffs of the general formula

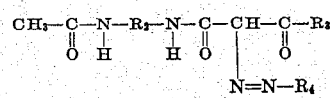

in which $R_2$ represents a radical of an aromatic 4,4'-diamino-compound of the diphenyl series, $R_3$ a radical of the group consisting of alkyl radicals and aryl radicals of the benzene series, and $R_4$ the radical of such a diazo-compound of the benzene series which contains no group promoting solubility, which products are yellow powders dissolving in pyridine to green-yellow to orange and in sulfuric acid to green-yellow to scarlet solutions, and dyeing the vegetable fiber fast yellow tints.

6. The monoazo dyestuffs of the general formula

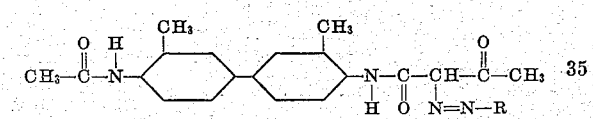

in which R represents the radical of a diazo compound of the benzene series containing neither sulfo groups nor carboxyl groups, which products are yellow powders dissolving in pyridine to orange to green-yellow solutions and in sulfuric acid to green-yellow to scarlet solutions, and dyeing vegetable fibers fast yellow tints.

7. The dyestuff of the formula

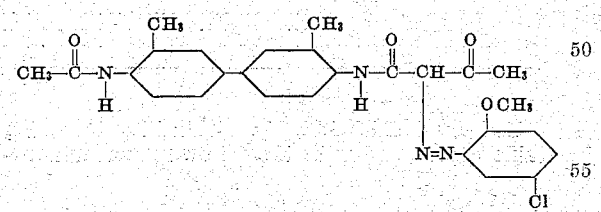

which product is a yellow powder dissolving in pyridine to an orange solution and in sulfuric acid to a brown-orange solution, and dyeing the vegetable fiber fast yellow tints.

8. The dyestuffs of the general formula

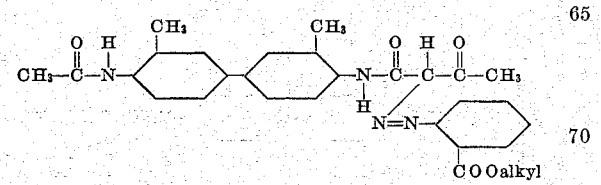

which products are yellow powders dissolving in pyridine to green-yellow solutions and in sulfuric acid to green-yellow solutions, and dyeing the vegetable fiber fast yellow tints.

9. The dyestuff of the formula

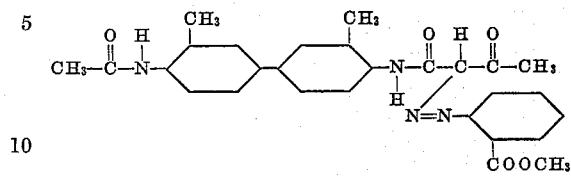

which product is a yellow powder dissolving in pyridine to a green-yellow solution and in sulfuric acid to a green-yellow solution, and dyeing the vegetable fiber fast yellow tints.

10. The dyestuff of the formula

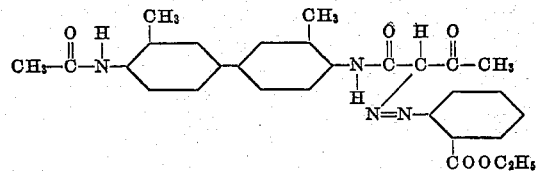

which product is a yellow powder dissolving in pyridine to a green-yellow solution and in sulfuric acid to a green-yellow solution, and dyeing the vegetable fiber fast yellow tints.

MAX SCHMID.

DISCLAIMER
2,043,869.—*Max Schmid*, Riehen, near Basel, Switzerland. MONOAZO DYESTUFFS. Patent dated June 9, 1936. Disclaimer filed March 23, 1939, by the assignee, *Society of Chemical Industry in Basle*.
Hereby disclaims claim 7; and
Hereby disclaims from the scope of claims 1, 2, 3, 4, 5, and 6 the dyestuff of the formula—
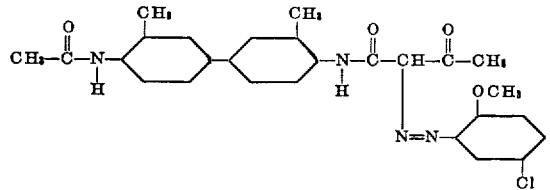
[*Official Gazette April 18, 1939.*]